United States Patent
Yu et al.

(10) Patent No.: US 10,390,370 B2
(45) Date of Patent: *Aug. 20, 2019

(54) RESOURCE DETERMINING METHOD, BASE STATION, AND USER EQUIPMENT

(71) Applicant: Huawei Technologies Co., Ltd., Shenzhen, Guangdong (CN)

(72) Inventors: Zheng Yu, Beijing (CN); Fang Nan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,222

(22) Filed: Jun. 14, 2017

(65) Prior Publication Data

US 2017/0290065 A1    Oct. 5, 2017

Related U.S. Application Data

(63) Continuation of application No. 14/698,625, filed on Apr. 28, 2015, now Pat. No. 9,699,813, which is a
(Continued)

(51) Int. Cl.
*H04W 74/08* (2009.01)
*H04W 72/02* (2009.01)
(Continued)

(52) U.S. Cl.
CPC ......... *H04W 74/0833* (2013.01); *H04W 4/70* (2018.02); *H04W 72/02* (2013.01); *H04W 74/002* (2013.01)

(58) Field of Classification Search
CPC ........... H04W 74/0833; H04W 74/002; H04W 72/02; H04W 4/005
See application file for complete search history.

(56) References Cited

U.S. PATENT DOCUMENTS 8,244,269 B2    8/2012   Park et al.
8,855,073 B2    10/2014  Han
(Continued)

FOREIGN PATENT DOCUMENTS

CN    102164421 A    8/2011
CN    102202412 A    9/2011
(Continued)

OTHER PUBLICATIONS

3GPP TS 36.211 V11.0.0 (Sep. 2012), 3rd Generation Partnership Project; Technical Specification Group Radio Access Network; Evolved Universal Terrestrial Radio Access (E-UTRA); Physical Channels and Modulation (Release 11), 106 pages.
(Continued)

*Primary Examiner* — Jamal Javaid

(57) ABSTRACT

This application discloses a resource determining method, a base station, and a user equipment. The method includes: determining a first narrowband resource available to an MTC terminal according to UE information in a random access process and/or common information of a cell; and transmitting control information and/or data on the first narrowband resource. According to the solutions of this application, in a case where the MTC terminal cannot receive RRC signaling, the narrowband resource available to the MTC terminal can still be determined beforehand, and communication between the MTC terminal and a network-side device is implemented by using the narrowband resource.

18 Claims, 3 Drawing Sheets

```
Determine a first narrowband resource available to an     / 101
MTC terminal according to UE information in a random
access process and/or common information of a cell ▼
Transmit control information and/or data on the first     / 102
                narrowband resource
```

Related U.S. Application Data continuation of application No. PCT/CN2012/083683, filed on Oct. 29, 2012.

(51) Int. Cl.
 *H04W 4/70* (2018.01)
 *H04W 74/00* (2009.01)

(56) References Cited

U.S. PATENT DOCUMENTS

| | | |
|---|---|---|
| 2008/0194243 A1 | 8/2008 | Jeong |
| 2009/0129326 A1 | 5/2009 | Kim et al. |
| 2011/0170515 A1 | 7/2011 | Kim |
| 2011/0268046 A1 | 11/2011 | Choi |
| 2011/0270984 A1 | 11/2011 | Park |
| 2011/0299492 A1 | 12/2011 | Lee et al. |
| 2011/0310854 A1 | 12/2011 | Zou et al. |
| 2013/0077584 A1 | 3/2013 | Lee |
| 2013/0083753 A1 | 4/2013 | Lee |
| 2013/0155894 A1 | 6/2013 | Li et al. |
| 2013/0301524 A1 | 11/2013 | Xu |
| 2019/0069297 A1 | 2/2019 | Lee et al. |

FOREIGN PATENT DOCUMENTS

| | | |
|---|---|---|
| CN | 102378211 A | 3/2012 |
| CN | 102421190 A | 4/2012 |
| CN | 102638880 A | 8/2012 |
| CN | 108934082 A | 12/2018 |
| EP | 2536242 A1 | 12/2012 |
| WO | 2011/097767 A1 | 8/2011 |
| WO | 2011150766 A1 | 12/2011 |

OTHER PUBLICATIONS

3GPP TS 36.213 V11.0.0 (Sep. 2012), 3rd Generation Partnership Project; Technical Specification Group Radio Access Network; Evolved Universal Terrestrial Radio Access (E-UTRA); Physical layer procedures (Release 11), 143 pages.

3GPP TS 36.331 V11.1.0 (Sep. 2012), 3rd Generation Partnership Project; Technical Specification Group Radio Access Network; Evolved Universal Terrestrial Radio Access (E-UTRA); Radio Resource Control (RRC); Protocol specification (Release 11), 325 pages.

RESOURCE DETERMINING METHOD, BASE STATION, AND USER EQUIPMENT

CROSS-REFERENCE TO RELATED APPLICATIONS

This application is a continuation of U.S. patent application Ser. No. 14/698,625, filed on Apr. 28, 2015, which is a continuation of International Application No. PCT/CN2012/083683, filed on Oct. 29, 2012, which are hereby incorporated by reference in their entireties.

TECHNICAL FIELD

This application relates to the communications field, and in particular, to a resource determining method, a base station, and a user equipment.

BACKGROUND

The Internet of things is a network that implements interconnection and interworking between a person and a thing, or between different things (M2M). The prior art provides a cost-efficient machine type communication (MTC) terminal (UE) based on Long Term Evolution (LTE), and the terminal is applicable to the Internet of things.

The maximum system bandwidth which the LTE system can support is 20 MHz, and an ordinary LTE terminal can receive and send data on the entire carrier. However, the MTC terminal can receive and send data within a small bandwidth (narrowband), which reduces the downlink data processing capacity and data storage of the MTC terminal and saves costs. In this case, the MTC terminal needs to know the narrowband resource (such as a narrowband frequency resource and/or time resource) available to the terminal on the broadband carrier beforehand so that the MTC terminal needs only to obtain and store data on the narrowband resource predetermined for the terminal.

In the prior art, a network-side device (such as a base station) notifies the available narrowband resource to the MTC terminal by using radio resource control (RRC) signaling. Before the MTC terminal can receive the RRC signaling, the MTC terminal and the network-side device (such as a base station) cannot negotiate the narrowband resource available to the MTC terminal, and the MTC terminal cannot communicate with the network-side device (such as a base station) by using the narrowband resource.

SUMMARY

This application discloses a resource determining scheme, which is used to solve the following problem in the in the prior art that an MTC terminal cannot communicate with a network-side device by using a narrowband resource before being capable of receiving RRC signaling.

According to a first aspect, a resource determining method is provided, including: determining a first narrowband resource available to a machine type communication MTC terminal according to user equipment UE information in a random access process and/or common information of a cell; and transmitting control information and/or data on the first narrowband resource.

In a first possible implementation manner of the first aspect, the determining a first narrowband resource available to an MTC terminal according to UE information in a random access process and/or common information of a cell includes: determining the first narrowband resource according to correspondence between the first narrowband resource and the UE information in the random access process and/or the common information of a cell; or determining the first narrowband resource according to an indication field in the UE information in the random access process.

With reference to any one of the possible implementation manners described above, in a second possible implementation manner of the first aspect, the first narrowband resource includes a narrowband frequency resource and/or a first time resource.

With reference to any one of the possible implementation manners described above, in a third possible implementation manner of the first aspect, the determining the first narrowband resource according to correspondence between the first narrowband resource and the UE information in the random access process and/or the common information of a cell includes:

determining K narrowband frequency resources corresponding to K transmission time points according to the following formula:

$$S_k=[S_1+(k-1)\times\Delta] \bmod N,$$

where $S_1=f(x,y) \bmod N$ or $S_1=\text{floor}[f(x,y)/N]$, where $S_k$ represents an index of a $k^{th}$ narrowband frequency resource, $S_1$ represents an index of a first narrowband frequency resource, $f(x, y)$ represents a function inclusive of x and/or y, x represents the UE information, y represents the common information of a cell, N represents a total number of narrowband frequency resources, mod represents a modulo operation, floor represents a round-down operation, $\Delta$ is a predetermined value, and $k=1, \ldots, K$, where K is an integer not less than 1.

With reference to any one of the possible implementation manners described above, in a fourth possible implementation manner of the first aspect, the determining the first narrowband resource according to correspondence between the first narrowband resource and the UE information in the random access process and/or the common information of a cell includes:

determining the first time resource according to one of the following formulas:

$$t_1=f(x,y) \bmod N1,$$

$$t_1=\text{floor}[f(x,y)/N1],$$

$$t_1 \bmod T=f(x,y) \bmod N1, \text{ and}$$

$$t_1 \bmod T=\text{floor}[f(x,y)/N1],$$

where $t_1$ represents an index of the first time resource, $f(x, y)$ represents a function inclusive of x and/or y, x represents the UE information, y represents the common information of a cell, N1 represents a total number of first time resources, mod represents a modulo operation, floor represents a round-down operation, and T represents a configuration cycle of the first time resource.

With reference to any one of the possible implementation manners described above, in a fifth possible implementation manner of the first aspect, the determining the first narrowband resource according to an indication field in the UE information in the random access process includes: receiving a first message in the random access process, where the first message carries the UE information inclusive of the indication field; and determining the first narrowband resource according to the indication field.

With reference to any one of the possible implementation manners described above, in a sixth possible implementation manner of the first aspect, the first message includes one of the following: a random access response message, a contention resolution message, and an answer message in response to the random access response message.

With reference to any one of the possible implementation manners described above, in a seventh possible implementation manner of the first aspect, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of a preamble sequence sent by the UE, a physical random access resource index, and a frequency start point of the physical random access resource.

With reference to any one of the possible implementation manners described above, in an eighth possible implementation manner of the first aspect, the transmitting control information and/or data on the first narrowband resource includes at least one of the following: receiving, by the UE, the contention resolution message on the first narrowband resource; sending, by a base station, the contention resolution message on the first narrowband resource; and transmitting, by the UE or base station, dedicated information on the first narrowband resource.

With reference to any one of the possible implementation manners described above, in a ninth possible implementation manner of the first aspect, the transmitting, by the UE or base station, dedicated information on the first narrowband resource, includes: using, by the UE or base station, the first narrowband resource when transmitting the dedicated information for the first time after the random access process.

According to a second aspect, a user equipment is provided, including: a determining unit, configured to determine a first narrowband resource available to a machine type communication MTC terminal according to user equipment UE information in a random access process and/or common information of a cell; and a transmitting unit, configured to transmit control information and/or data on the first narrowband resource.

In a first possible implementation manner of the second aspect, the determining unit is configured to determine the first narrowband resource according to correspondence between the first narrowband resource and the UE information in the random access process and/or the common information of a cell; or the determining unit is configured to determine the first narrowband resource according to an indication field in the UE information in the random access process.

With reference to any one of the possible implementation manners described above, in a second possible implementation manner of the second aspect, the first narrowband resource includes a narrowband frequency resource and/or a first time resource.

With reference to any one of the possible implementation manners described above, in a third possible implementation manner of the second aspect, the determining unit is configured to: in the following manner, determine the first narrowband resource according to correspondence between the first narrowband resource and the UE information in the random access process and/or the common information of a cell:

determining K narrowband frequency resources corresponding to K transmission time points according to the following formula:

$$S_k = [S_1 + (k-1) \times \Delta] \bmod N,$$

where $S_1 = f(x,y) \bmod N$ or $S_1 = \text{floor}[f(x,y)/N]$, where $S_k$ represents an index of a $k^{th}$ narrowband frequency resource, $S_1$ represents an index of a first narrowband frequency resource, $f(x, y)$ represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, ..., K, where K is an integer not less than 1.

With reference to any one of the possible implementation manners described above, in a fourth possible implementation manner of the second aspect, the determining unit is configured to: in the following manner, determine the first narrowband resource according to correspondence between the first narrowband resource and the UE information in the random access process and/or the common information of a cell:

determining the first time resource according to one of the following formulas:

$$t_1 = f(x,y) \bmod N1,$$

$$t_1 = \text{floor}[f(x,y)/N1],$$

$$t_1 \bmod T = f(x,y) \bmod N1, \text{ and}$$

$$t_1 \bmod T = \text{floor}[f(x,y)/N1],$$

where $t_1$ represents an index of the first time resource, $f(x, y)$ represents a function inclusive of x and/or y, x represents the UE information, y represents the common information of a cell, N1 represents a total number of first time resources, mod represents a modulo operation, floor represents a round-down operation, and T represents a configuration cycle of the first time resource.

With reference to any one of the possible implementation manners described above, in a fifth possible implementation manner of the second aspect, the user equipment further includes: a transceiver unit, configured to receive or send a first message in the random access process, where the first message carries the UE information inclusive of the indication field, where the determining unit is further configured to determine the first narrowband resource according to the indication field.

With reference to any one of the possible implementation manners described above, in a sixth possible implementation manner of the second aspect, the first message includes one of the following: a random access response message, a contention resolution message, and an answer message in response to the random access response message.

With reference to any one of the possible implementation manners described above, in a seventh possible implementation manner of the second aspect, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

With reference to any one of the possible implementation manners described above, in an eighth possible implementation manner of the second aspect, the transmitting unit is configured to transmit control information and/or data on the first narrowband resource in at least one of the following manners: receiving the contention resolution message on the first narrowband resource; and transmitting dedicated information on the first narrowband resource. With reference to any one of the possible implementation manners described above, in a ninth possible implementation manner of the second aspect, the transmitting unit transmits the dedicated information on the first narrowband resource in the following manner: using the first narrowband resource when transmitting the dedicated information for the first time after the random access process.

According to a third aspect, a user equipment is provided, including: a transceiver, configured to receive and send a signal; and a processor, configured to perform the following steps: determining a first narrowband resource available to a machine type communication MTC terminal according to user equipment UE information in a random access process and/or common information of a cell; and controlling the transceiver to transmit control information and/or data on the first narrowband resource.

In a first possible implementation manner of the third aspect, the processor is configured to: in the following manner, determine a first narrowband resource available to a machine type communication MTC terminal according to user equipment UE information in a random access process and/or common information of a cell: determining the first narrowband resource according to correspondence between the first narrowband resource and the UE information in the random access process and/or the common information of a cell; or determining the first narrowband resource according to an indication field in the UE information in the random access process.

With reference to any one of the possible implementation manners described above, in a second possible implementation manner of the third aspect, the first narrowband resource includes a narrowband frequency resource and/or a first time resource.

With reference to any one of the possible implementation manners described above, in a third possible implementation manner of the third aspect, in the following manner, the processor determines the first narrowband resource according to correspondence between the first narrowband resource and the UE information in the random access process and/or the common information of a cell:

determining K narrowband frequency resources corresponding to K transmission time points according to the following formula:

$$S_k = [S_1 \alpha(k-1) \times \Delta] \bmod N,$$

where $S_1 = f(x, y) \bmod N$ or $S_1 = \mathrm{floor}[f(x, y)/N]$, where $S_k$ represents an index of a $k^{th}$ narrowband frequency resource, $S_1$ represents an index of a first narrowband frequency resource, f(x, y) represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, . . . , K, where K is an integer not less than 1.

With reference to any one of the possible implementation manners described above, in a fourth possible implementation manner of the third aspect, in the following manner, the processor determines the first narrowband resource according to correspondence between the first narrowband resource and the UE information in the random access process and/or the common information of a cell:

determining the first time resource according to one of the following formulas:

$$t_1 = f(x,y) \bmod N1,$$

$$t_1 = \mathrm{floor}[f(x,y)/N1],$$

$$t_1 \bmod T = f(x,y) \bmod N1, \text{ and}$$

$$t_1 \bmod T = \mathrm{floor}[f(x,y)/N1],$$

where $t_1$ represents an index of the first time resource, f(x, y) represents a function inclusive of x and/or y, x represents the UE information, y represents the common information of a cell, N1 represents a total number of first time resources, mod represents a modulo operation, floor represents a round-down operation, and T represents a configuration cycle of the first time resource.

With reference to any one of the possible implementation manners described above, in a fifth possible implementation manner of the third aspect, the processor is configured to determine the first narrowband resource in the following manner according to an indication field in the UE information in the random access process: controlling the transceiver to receive or send a first message in the random access process, where the first message carries the UE information inclusive of the indication field; and determining the first narrowband resource according to the indication field.

With reference to any one of the possible implementation manners described above, in a sixth possible implementation manner of the third aspect, the first message includes one of the following: a random access response message, a contention resolution message, and an answer message in response to the random access response message.

With reference to any one of the possible implementation manners described above, in a seventh possible implementation manner of the third aspect, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

With reference to any one of the possible implementation manners described above, in an eighth possible implementation manner of the third aspect, the processor controls the transceiver in at least one of the following manners to transmit control information and/or data on the first narrowband resource: the processor controls the transceiver to receive the contention resolution message on the first narrowband resource; and the processor controls the transceiver to transmit dedicated information on the first narrowband resource.

With reference to any one of the possible implementation manners described above, in a ninth possible implementation manner of the third aspect, the processor controls the transceiver in the following manner to transmit dedicated information on the first narrowband resource: the processor controls the transceiver to use the first narrowband resource when transmitting the dedicated information for the first time after the random access process.

According to a fourth aspect, a base station is provided, including: a determining unit, configured to determine a first narrowband resource available to a machine type communication MTC terminal according to user equipment UE information in a random access process and/or common information of a cell; and a transmitting unit, configured to transmit control information and/or data on the first narrowband resource.

In a first possible implementation manner of the fourth aspect, the determining unit is configured to determine the first narrowband resource according to correspondence between the first narrowband resource and the UE information in the random access process and/or the common information of a cell; or the determining unit is configured to determine the first narrowband resource according to an indication field in the UE information in the random access process.

With reference to any one of the possible implementation manners described above, in a second possible implementation manner of the fourth aspect, the first narrowband resource includes a narrowband frequency resource and/or a first time resource.

With reference to any one of the possible implementation manners described above, in a third possible implementation manner of the fourth aspect, the determining unit is configured to: in the following manner, determine the first narrowband resource according to correspondence between the first narrowband resource and the UE information in the random access process and/or the common information of a cell:

determining K narrowband frequency resources corresponding to K transmission time points according to the following formula:

$$S_k = [S_1 + (k-1) \times \Delta] \bmod N,$$

where $S_1 = f(x,y) \bmod N$ or $S_1 = \text{floor}[f(x, y)/N]$,
where $S_k$ represents an index of a $k^{th}$ narrowband frequency resource, $S_1$ represents an index of a first narrowband frequency resource, $f(x, y)$ represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, . . . , K, where K is an integer not less than 1.

With reference to any one of the possible implementation manners described above, in a fourth possible implementation manner of the fourth aspect, the determining unit is configured to: in the following manner, determine the first narrowband resource according to correspondence between the first narrowband resource and the UE information in the random access process and/or the common information of a cell:

determining the first time resource according to one of the following formulas:

$$t_1 = f(x,y) \bmod N1,$$

$$t_1 = \text{floor}[f(x,y)/N1],$$

$$t_1 \bmod T = f(x,y) \bmod N1, \text{ and}$$

$$t_1 \bmod T = \text{floor}[f(x,y)/N1],$$

where $t_1$ represents an index of the first time resource, $f(x,y)$ represents a function inclusive of x and/or y, x represents the UE information, y represents the common information of a cell, N1 represents a total number of first time resources, mod represents a modulo operation, floor represents a round-down operation, and T represents a configuration cycle of the first time resource.

With reference to any one of the possible implementation manners described above, in a fifth possible implementation manner of the fourth aspect, the base station further includes: a transceiver unit, configured to receive or send a first message in the random access process, where the first message carries the UE information inclusive of the indication field; and the determining unit is further configured to determine the first narrowband resource according to the indication field.

With reference to any one of the possible implementation manners described above, in a sixth possible implementation manner of the fourth aspect, the first message includes one of the following: a random access response message, a contention resolution message, and an answer message in response to the random access response message.

With reference to any one of the possible implementation manners described above, in a seventh possible implementation manner of the fourth aspect, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

With reference to any one of the possible implementation manners described above, in an eighth possible implementation manner of the fourth aspect, the transmitting unit is configured to transmit control information and/or data on the first narrowband resource in at least one of the following manners: the transmitting unit is configured to send the contention resolution message on the first narrowband resource; and the transmitting unit is configured to transmit dedicated information on the first narrowband resource.

With reference to any one of the possible implementation manners described above, in a ninth possible implementation manner of the fourth aspect, the transmitting, by the transmitting unit, dedicated information on the first narrowband resource, includes: using, by the transmitting unit, the first narrowband resource when transmitting the dedicated information for the first time after the random access process.

According to a fifth aspect, a base station is provided, including: a transceiver, configured to receive and send a signal; and a processor, configured to perform the following steps: determining a first narrowband resource available to a machine type communication MTC terminal according to user equipment UE information in a random access process and/or common information of a cell; and controlling the transceiver to transmit control information and/or data on the first narrowband resource.

In a first possible implementation manner of the fifth aspect, the processor is configured to: in the following manner, determine a first narrowband resource available to a machine type communication MTC terminal according to UE information in a random access process and/or common information of a cell: determining the first narrowband resource according to correspondence between the first narrowband resource and the UE information in the random access process and/or the common information of a cell; or determining the first narrowband resource according to an indication field in the UE information in the random access process.

With reference to any one of the possible implementation manners described above, in a second possible implementation manner of the fifth aspect, the first narrowband resource includes a narrowband frequency resource and/or a first time resource.

With reference to any one of the possible implementation manners described above, in a third possible implementation manner of the fifth aspect, in the following manner, the processor determines the first narrowband resource according to correspondence between the first narrowband resource and the UE information in the random access process and/or the common information of a cell:
determining K narrowband frequency resources corresponding to K transmission time points according to the following formula:

$S_k = [S_1 + (k-1) \times \Delta] \mod N$, where $S_1 = f(x, y) \mod N$ or $S_1 = \text{floor}[f(x,y)/N]$,
where $S_k$ represents an index of a $k^{th}$ narrowband frequency resource, $S_1$ represents an index of a first narrowband frequency resource, f(x, y) represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, ..., K, where K is an integer not less than 1.

With reference to any one of the possible implementation manners described above, in a fourth possible implementation manner of the fifth aspect, in the following manner, the processor determines the first narrowband resource according to correspondence between the first narrowband resource and the UE information in the random access process and/or the common information of a cell:
determining the first time resource according to one of the following formulas:

$t_1 = f(x,y) \mod N1$, $t_1 = \text{floor}[f(x,y)/N1]$, $t_1 \mod T = f(x,y) \mod N1$, and $t_1 \mod T = \text{floor}[f(x,y)/N1]$, where $t_1$ represents an index of the first time resource, f(x, y) represents a function inclusive of x and/or y, x represents the UE information, y represents the common information of a cell, N1 represents a total number of first time resources, mod represents a modulo operation, floor represents a round-down operation, and T represents a configuration cycle of the first time resource.

With reference to any one of the possible implementation manners described above, in a fifth possible implementation manner of the fifth aspect, the processor is configured to determine the first narrowband resource in the following manner according to an indication field in the UE information in the random access process: controlling the transceiver to receive or send a first message in the random access process, where the first message carries the UE information inclusive of the indication field; and determining the first narrowband resource according to the indication field.

With reference to any one of the possible implementation manners described above, in a sixth possible implementation manner of the fifth aspect, the first message includes one of the following: a random access response message, a contention resolution message, and an answer message in response to the random access response message.

With reference to any one of the possible implementation manners described above, in a seventh possible implementation manner of the fifth aspect, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

With reference to any one of the possible implementation manners described above, in an eighth possible implementation manner of the fifth aspect, the processor controls the transceiver in at least one of the following manners to transmit control information and/or data on the first narrowband resource: the processor controls the transceiver to send the contention resolution message on the first narrowband resource; and the processor controls the transceiver to transmit dedicated information on the first narrowband resource.

With reference to any one of the possible implementation manners described above, in a ninth possible implementation manner of the fifth aspect, the controlling, by the processor, the transceiver to transmit dedicated information on the first narrowband resource, includes: controlling, by the processor, the transceiver to use the first narrowband resource when transmitting the dedicated information for the first time after the random access process.

In this application, the narrowband resource used by the MTC terminal is determined according to the UE information and/or the common information of the cell in the random access process. Therefore, in a case where the MTC terminal cannot receive the RRC signaling, the narrowband resource available to the MTC terminal can still be determined beforehand, and the communication between the MTC terminal and the network-side device (such as a base station) is implemented by using the narrowband resource.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention. It should be noted that the following embodiments and the features thereof may combine with each other if no contradiction occurs.

In this application, a narrowband frequency resource may be a resource including one or more physical resource blocks, or may be a resource including one or more subcarriers, or may be a resource including one or more subbands. A time resource may be at least one of the following: a time subframe resource, a time frame resource, and a timeslot resource. In this application, transmission may mean sending and/or receiving. A user equipment (UE) in this application may be an MTC terminal such as a cost-efficient MTC terminal or another terminal. This application uses an MTC terminal and a network-side device as examples to describe the specific implementation of the present invention. However, the method in this application may be similarly applied to direct communication between different user equipment.

An embodiment of the present invention provides a resource determining method. Unless otherwise expressly specified, the method may be implemented by a network-side device (such as a base station), a UE, or a relay. The UE may be an MTC terminal such as a cost-efficient MTC terminal.

Figure 1:
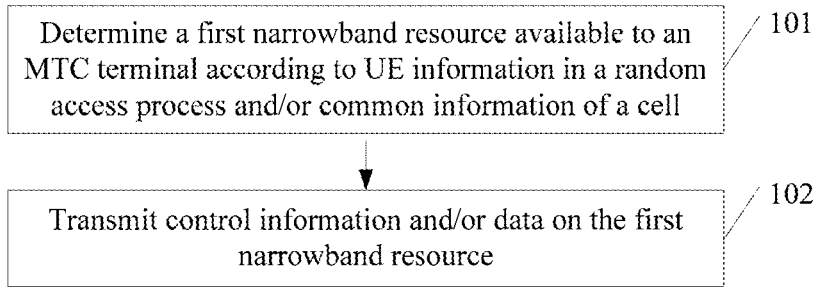
FIG. 1 is a flowchart of a resource determining method according to an embodiment of the present invention.
Figure 2:
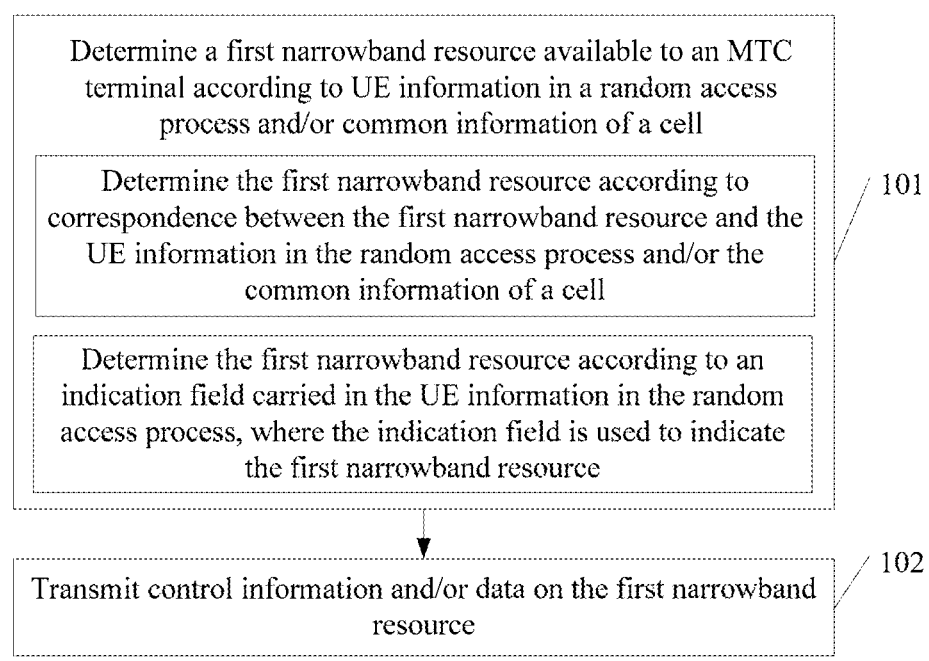
FIG. 2 is a detailed flowchart of a resource determining method according to an embodiment of the present invention.

FIG. 1 is a flowchart of a resource determining method according to an embodiment of the present invention. As shown in FIG. 1, the method includes:

Step 101: Determine a first narrowband resource according to UE information in a random access process and/or common information of the cell. For example, according to the UE information (UE-specific information) and/or common information of the cell in the random access process, the first narrowband resource available to the MTC terminal is determined. In this embodiment, the UE information may be UE-specific information (UE-specific information).

Step 102: Transmit control information and/or data on the first narrowband resource.

In the prior art, before the MTC terminal can receive RRC signaling, the MTC terminal cannot negotiate with the network-side device about the narrowband resource available to the MTC terminal. For example, after being started up, the MTC terminal generally initiates a connection to a base station or a network by using a random access process. The random access process is classified into a contending random access process or a non-contending random access process. Before completion of the random access process, no dedicated (dedicated) or UE-specific (UE-specific) radio resource control (RRC) connection is created between the MTC terminal and the network-side device (such as a base station). In this case, the network-side device cannot notify the narrowband resource available to the MTC terminal by using dedicated RRC signaling.

In this embodiment, the narrowband resource used by the MTC terminal is determined according to the UE information and/or the common information of the cell in the random access process. Therefore, in a case where the MTC terminal cannot receive the RRC signaling, the narrowband resource available to the MTC terminal can still be determined.

Preferably, the first narrowband resource may be including multiple physical resource blocks (PRB).

Optionally, the first narrowband resource includes a narrowband frequency resource and/or a first time resource. Therefore, the first narrowband resource may be including frequency resources and time resources of different granularities. For example, the time resources may use a frame or a subframe as granularity. If the first narrowband resource includes only a narrowband frequency resource, it may be deemed by default that the MTC terminal uses the narrowband frequency resource for transmission in all subframes. If the narrowband resource includes both a narrowband frequency resource and a first time resource, the MTC terminal uses the narrowband frequency resource for transmission on the first time resource, and may enter a power-saving state in other time, thereby achieving the objective of saving resources.

The narrowband frequency resource may be a resource on a carrier frequency resource, or a resource corresponding to multiple physical resource blocks, or a resource including multiple subcarriers. The first time resource may be including at least one of the following: one or more subframes, radio frames, timeslots, and orthogonal frequency division multiplexing (OFDM) symbols.

Assuming that a system splits a frequency resource on a broadband carrier into multiple narrowband frequency resources, the bandwidth that can be processed by the cost-efficient MTC terminal is not less than the narrowband frequency resource size. For example, using an LTE 20-MHz carrier as an example, a 20-MHz carrier includes 100 physical resource blocks (PRBs), and the base station may split a 20-MHz frequency resource into multiple narrowband frequency resources. Each narrowband frequency resource includes a limited number of physical resource blocks (for example, each narrowband resource includes 6 PRBs as frequency resources). The narrowband frequency resource may be determined in a localized or distributed manner in the prior art. The physical resource blocks included in a narrowband frequency resource may be continuous physical resource blocks or discrete physical resource blocks.

The splitting of the narrowband frequency resource may be predetermined by the system. The information about the splitting of the narrowband frequency resource may include at least one of the following information: number of narrowband frequency resources, size of the narrowband frequency resource, and the frequency location of each narrowband frequency resource on the carrier.

Optionally, the method may be implemented by a UE. After determining the first narrowband resource, the UE may notify the first narrowband resource to the network-side device, so as to implement communication between the network-side device and the user equipment. For example, the UE information and/or the common information of the cell used by the first narrowband resource are sent to the network-side device, so that the network-side device can determine the first narrowband resource in the manner described in this embodiment.

Preferably, the method may be implemented by a network-side device. After determining the first narrowband resource, the network-side device may notify the first narrowband resource to the UE, so as to implement communication between the network-side device and the UE. For example, the UE information and/or the common information of the cell used by the first narrowband resource are sent to the UE, so that the UE can determine the first narrowband resource in the manner described in this embodiment.

In an exemplary implementation manner of the embodiment of the present invention, step 101 may be implemented in any one of the following manners:

Manner 1: Determine the first narrowband resource according to correspondence between the first narrowband resource and the UE information in the random access process and/or the common information of a cell. The correspondence may be a one-to-one relationship or a many-to-one relationship. The correspondence may be embodied by a formula or by a correspondence table.

Optionally, manner 1 may be implemented by any one of the following methods:

Method 1: Determine K narrowband frequency resources corresponding to K transmission time points according to the following formula:

$$S_k = [S_1 + (k-1) \times \Delta] \bmod N,$$

where $S_1 = f(x,y) \bmod N$ or $S_1 = \text{floor}[f(x,y)/N]$ where f(x, y) represents a function inclusive of x and/or y, x represents the UE information in the random access process, y represents the common information of a cell in the random access process, N represents a total number of narrowband frequency resources, mod represents a modulo operation, floor represents a round-down operation, $\Delta$ is a predetermined value, and k=1, . . . , K, where K is an integer not less than 1. f(x, y) may be a function inclusive of x and/or y, for example, an arithmetic operation function inclusive of x, y, and a constant, or a logarithmic operation function inclusive of x, y, and a constant, or an arithmetic operation function inclusive of x and a constant, or a logarithmic operation function inclusive of x and a constant, or an arithmetic operation function inclusive of y and a constant, or a logarithmic operation function inclusive of y and a constant.

In this embodiment, there may be one or more narrowband frequency resources. If there is only one narrowband frequency resource, it is determined that the narrowband resource in an initial state is available. If there are multiple narrowband frequency resources, the method in this embodiment may be used to determine the narrowband resource available anytime after startup of the UE. In this case, the narrowband frequency resource may undergo frequency hopping transformation according to a predefined rule.

Method 2: Determine the first time resource according to one of the following formulas:

$$t_1 = f(x,y) \bmod N1,$$

$$t_1 = \text{floor}[f(x,y)/N1],$$

$$t_1 \bmod T = f(x,y) \bmod N1, \text{ and}$$

$$t_1 \bmod T = \text{floor}[f(x,y)/N1]$$

where $t_1$ represents an index of the first time resource, f(x, y) represents a function inclusive of x and/or y, x represents the UE information in the random access process, y represents the common information of a cell in the random access process, N1 represents a total number of first time resources, mod represents a modulo operation, floor represents a round-down operation, and T represents a configuration cycle of the first time resource. f(x, y) may be a function inclusive of x and/or y, for example, an arithmetic operation function inclusive of x, y, and a constant, or a logarithmic operation function inclusive of x, y, and a constant, or an arithmetic operation function inclusive of x and a constant, or a logarithmic operation function inclusive of x and a constant, or an arithmetic operation function inclusive of y and a constant, or a logarithmic operation function inclusive of y and a constant.

In this embodiment, there may be one or more first time resources. If there is only one first time resource, it is determined that the narrowband resource is available anytime. In this way, the user equipment can receive and send signals only on the first time resource, and may be in the power-saving state in other time, thereby achieving the objective of saving energy. If there are multiple first time resources, where the first time resource includes cycle information T, the method in this embodiment may be used to determine the first time resource in the cycle, so as to use the narrowband resource at multiple time points.

Optionally, in manner 1, after the first narrowband resource is determined, the network-side device or user equipment may send the determined first narrowband resource to the peer end (the user equipment or the network-side device); or send the UE information and/or common information of the cell in the random access process to the peer end so that the peer end determines the first narrowband resource in the same manner. The network-side device or the user equipment may send the foregoing content by using a message in the random access process. For example, the network-side device may send the foregoing content to the user equipment by using a random access response message or a contention resolution message, and the user equipment may send the foregoing message to the network-side device by using a random access request message or an answer message (Msg3) in response to the random access response message.

Manner 2: Determine the first narrowband resource according to an indication field in the UE information in the random access process. For example, the indication field may include an identifier of the first narrowband resource.

In this embodiment, the first narrowband resource can be determined conveniently in the above two manners.

Optionally, in manner 2, the first message is received in the random access process, where the first message carries the UE information inclusive of the indication field; and the first narrowband resource is determined according to the indication field.

Preferably, the first message may be one of the following: a random access response message, a contention resolution message, and an answer message in response to the random access response message. If the first message is a random access response message or a contention resolution message, the network-side device sends the first message to the user equipment in the random access process. If the first message is an answer message in response to the random access response message, the user equipment sends the first message to the network-side device in the random access process. This embodiment is advantaged by ease of implementation.

Optionally, the common information of a cell includes at least one of the following: a system frame number, a subframe number, a timeslot number, a cell identifier ID, one or more parameters in a physical random access channel configuration (PRACH-Config), and one or more parameters in a common configuration of a random access channel (RACH-ConfigCommon); the UE information includes at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

In another exemplary implementation manner of the embodiment of the present invention, step 102 may include at least one of the following:

receiving, by the UE, the contention resolution message on the first narrowband resource in the random access process;

sending, by the base station, the contention resolution message on the first narrowband resource in the random access process;

using, by the UE or base station, the first narrowband resource when transmitting the dedicated information for the first time after the random access process; and transmitting, by the UE or base station, dedicated information on the first narrowband resource.

In this embodiment, the UE and the base station can receive and send messages in the random access process by using the first narrowband resource, thereby saving costs. In addition, in the prior art, contention resolution messages of different MTC terminals can be transmitted on only a preset or default common narrowband resource of the system, which increases the probability of blocking on the data resources. In this embodiment, the contention resolution message is sent on the first narrowband resource when the UE receives the contention resolution message on the first narrowband resource or when the base station sends the contention resolution message on the first narrowband resource, thereby reducing the probability of blocking. In addition, the UE and the base station receive or send information by using the first narrowband resource determined according to the UE information and/or the common information of the cell in the random access process. Therefore, in a case where the MTC terminal cannot receive the RRC signaling, the narrowband resource available to the MTC terminal can still be determined.

In this embodiment, in a case where the RRC signaling cannot be received, the initial UE-specific narrowband frequency resource and/or time resource of the MTC terminal can be determined, and therefore, the data transmission of different UEs is decentralized, and the blocking probability and the communication delay are reduced.

Embodiment 1

Figure 3:
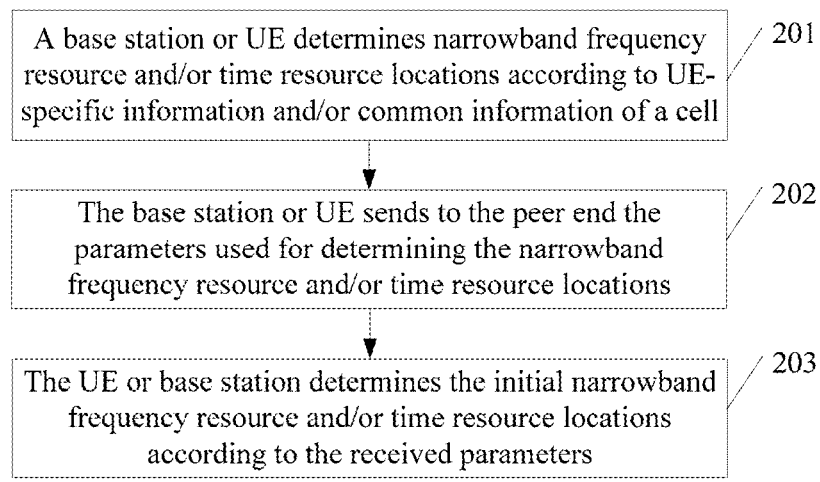
FIG. 3 is a flowchart of a resource determining method according to Embodiment 1 of the present invention.

This embodiment provides a resource determining method. The method may be used to determine a resource available to an MTC terminal. As shown in FIG. 3, the method includes: Step 201: A base station or UE determines initial UE-specific narrowband frequency resource and/or time resource locations according to at least one of the following: temporary C-RNTI, UE-specific parameters (for example, at least one of: a subframe index of a preamble sent by the UE, a frame index, a physical random access resource index, and a frequency start point of the physical random access resource), and common information of a cell (for example, at least one of: system frame number, subframe number, timeslot number, and cell ID), where the above parameters or a combination thereof may indicate the initial UE-specific narrowband frequency resource and/or time resource locations.

The following gives several examples of the determining manner.

Assuming that on a 20-MHz carrier, the system sets a total of N narrowband frequency resources.

Manner 1

The initial UE-specific narrowband frequency resource of UEx may be determined according to the following formula: The initial UE-specific narrowband frequency resource index of UEx=(a decimal value corresponding to the temporary C-RNTI of UEx)mod N, where mod is a modulo operation, and N may be the total number of narrowband frequency resources in a carrier or the total number of narrowband frequency resources in multiple carriers. If N is the total number of narrowband frequency resources in multiple carriers, N is determined after the narrowband frequency resources included in each of the multiple carriers are numbered jointly and uniformly. In this case, once the UE determines an index of a narrowband frequency resource in the multiple carriers, the UE determines the index of the carrier where this narrowband frequency resource is located and the index of narrowband frequency resources in this carrier. Because the temporary C-RNTI is a binary bit string whose length is 16, the string is converted into a decimal form in the modulo operation.

Manner 2

The initial UE-specific narrowband frequency resource of UEx may be determined according to the following formula:
The initial UE-specific narrowband frequency resource index of UEx=(a decimal value corresponding to the temporary C-RNTI of UEx)mod N,
where mod is a modulo operation. Because the temporary C-RNTI is a binary bit string whose length is 16, the string is converted into a decimal form in the modulo operation.

The initial UE-specific time resource of UEx may be determined according to at least one of the following formulas:
the initial UE-specific narrowband time subframe resource index of UEx=(a decimal value corresponding to the temporary C-RNTI of UEx)mod $N_S$; and the initial UE-specific narrowband time frame resource index of UEx=(a decimal value corresponding to the temporary C-RNTI of UEx)mod $N_{SFN}$,
where Ns is the maximum number of subframes included in a radio frame, and, for an LTE system, $N_S$=10; $N_{SFN}$ is the maximum number of system frames, where SFN is an acronym of system frame number, whose value range is 0 to 1023, covering 1024 values in total, and in an LTE system, $N_{SFN}$=1024.

Similarly, the temporary C-RNTI may be combined with the common information of the cell to determine the initial UE-specific narrowband frequency resource location and the time resource location, or the common information of the cell alone may be used to determine the initial UE-specific narrowband frequency resource location and the time resource location.

Manner 3 the initial UE-specific narrowband frequency resource index of UEx=(a decimal value corresponding to the temporary C-RNTI of UEx)mod N; and
the initial UE-specific time subframe resource index of UEx=Ms mod $N_S$,
where Ms is a preamble index of a preamble sent by UEx, and Ns is the maximum number of subframes included in a radio frame, and, for an LTE system, $N_S$=10.

Manner 4 the initial UE-specific narrowband frequency resource index of UEx=(a decimal value corresponding to the temporary C-RNTI of UEx)mod N; and the initial UE-specific time subframe resource index of UEx=(a decimal value corresponding to the temporary C-RNTI of UEx+Ms)mod $N_S$,
where Ms is a preamble index of a preamble sent by UEx, and Ns is the maximum number of subframes included in a radio frame, and, for an LTE system, Ns=10.

It should be noted that the initial UE-specific narrowband frequency resource and/or time resource locations may be determined according to different combinations of the above parameters. For example, the initial UE-specific narrowband frequency resource alone is determined according to one parameter or a combination of multiple parameters; or the initial UE-specific time resource alone is determined according to one parameter or a combination of multiple parameters; or the initial UE-specific narrowband frequency resource and time resource are determined according to one parameter or a combination of multiple parameters. The determining method is similar to the foregoing method, and is not described exhaustively here any further.

Step 202: If step 201 is performed by a base station, the base station sends the parameters used for determining the UE-specific narrowband frequency resource and/or time resource locations to the UE. For example, the base station uses a random access response message in the random access process to send the temporary C-RNTI configured for UEx to UEx. If step 201 is performed by a UE, the UE sends the parameters used for determining the UE-specific narrowband frequency resource and/or time resource locations to the base station. For example, the UE uses a random access request message to send the preamble to the base station.

Step 203: The UE or base station determines the initial UE-specific narrowband frequency resource and/or time resource locations according to the received or detected parameters, and the determining method is the same as step 201 and is not repeated here any further.

Subsequently, the base station transmits control information (such as an enhanced physical downlink control channel (ePDCCH) and/or data (such as a contention resolution message or physical downlink shared channel (PDSCH) transmission) for the UE on the determined initial narrowband frequency resource and/or time resource, and the UE receives the control information and/or data on the determined initial narrowband frequency resource and/or time resource.

It should be noted that the order of performing step 202 and step 201 is not limited, and step 202 may be performed before step 201, or steps 202 and 201 may be performed concurrently, or step 201 may be performed before step 202.

In this embodiment, no new signaling needs to be defined for notifying the initial UE-specific narrowband frequency resource and/or time resource locations, thereby saving signaling overhead.

Embodiment 2

This embodiment provides a resource determining method. The method may be used to determine a resource available to an MTC terminal. In this method, a UE and a base station may determine the narrowband frequency resource and/or time resource according to one of the following parameters: an index of a preamble sequence sent by the UE in a random access process, parameters for sending the preamble sequence (for example, at least one of: a subframe index for sending the preamble sequence, a frame index, a physical random access resource index, and a frequency start point of the physical random access resource), and common information of a cell (for example, at least one of: system frame number, subframe number, timeslot number, and cell ID).

In the contending random access process, the UE selects a preamble sequence randomly for random access in a configured preamble sequence set, and sends the preamble sequence to the base station.

The determining method in this embodiment is similar to that in Embodiment 1. The following gives an example to describe the method in this embodiment.

The narrowband frequency resource may be determined according to an index of a preamble sequence sent by the UE in the random access process. For example:
the initial UE-specific narrowband frequency resource index of UEx=(an index value of a preamble sequence sent by UEx)mod N,
where N is the total number of narrowband frequency resources in a carrier or the total number of narrowband frequency resources in multiple carriers. If N is the total number of narrowband frequency resources in multiple carriers, N is determined after the narrowband frequency resources included in each of the multiple carriers are numbered jointly and uniformly. In this case, once the UE determines an index of a narrowband frequency resource in the multiple carriers, the UE determines the index of the carrier where this narrowband frequency resource is located and the index of narrowband frequency resources in this carrier.

Preferably, the narrowband frequency resource may be determined according to the index of the preamble sequence and the parameters for sending the preamble sequence. For example:

the initial UE-specific narrowband frequency resource index of UEx=(the index value of the preamble sequence sent by UEx+l*$t_d$+k*$f_d$)mod N, where l and k are integers, $t_d$ is a subframe index of a preamble sequence sent by the UE, and $f_d$ is an index of a physical random access resource of the preamble sequence sent by the UE on the frequency.

It should be noted that the narrowband frequency resource and/or time resource locations may be determined according to different combinations of the above parameters. For example, the narrowband frequency resource alone is determined according to one parameter or a combination of multiple parameters; or the time resource alone is determined according to one parameter or a combination of multiple parameters; or the narrowband frequency resource and time resource are determined according to one parameter or a combination of multiple parameters. The determining method is similar to the foregoing method, and is not described exhaustively here any further.

In this embodiment, no new signaling needs to be defined for notifying the initial UE-specific narrowband frequency resource and/or time resource locations, thereby saving signaling overhead.

Embodiment 3

This embodiment provides a resource determining method. The method may be used to determine a resource available to an MTC terminal. In this method, the UE-specific narrowband frequency resource may be determined according to a PRB index of uplink resources allocated for transmitting an answer message in response to a random access response message.

In this embodiment, the base station sends a random access response message to the UE, where the random access response message carries PRB index information of uplink resources allocated for transmitting an answer message in response to the random access response message. For example, the random access response message carries information about allocation of resources for transmitting the answer message in response to the random access response message (the information about allocation of resources may be carried in an uplink grant (Uplink grant, UL grant), and the UL grant is carried in the random access response message). The information about allocation of resources includes PRB index information of uplink resources allocated for transmitting the answer message in response to the random access response message. Then the UE may determine the UE-specific narrowband frequency resource according to the PRB index of the uplink physical resource used for transmitting the answer message in response to the random access response message.

For example, the initial UE-specific narrowband frequency resource index of UEx=(minimum or maximum uplink PRB index value used by UEx for sending the answer message in response to the random access response message)mod N.

The minimum or maximum uplink PRB index value used by UEx for sending the answer message in response to the random access response message may be the minimum or maximum uplink PRB index value used for sending the answer message in response to the random access response message within a first timeslot or the minimum or maximum uplink PRB index value used for sending the answer message in response to the random access response message within a second timeslot.

Preferably, the narrowband frequency resource may also be determined according to the following formula:

the initial UE-specific narrowband frequency resource index of UEx=floor (minimum or maximum uplink PRB index value used by UEx for sending the answer message in response to the random access response message/the number of PRBs included in the narrowband frequency resource), where floor(x) refers to rounding x down.

It should be noted that the narrowband frequency resource and/or time resource locations may be determined according to different combinations of the above parameters. For example, the narrowband frequency resource alone is determined according to one parameter or a combination of multiple parameters; or the time resource alone is determined according to one parameter or a combination of multiple parameters; or the narrowband frequency resource and time resource are determined according to one parameter or a combination of multiple parameters. The determining method is similar to the foregoing method, and is not described exhaustively here any further.

In this embodiment, no new signaling needs to be defined for notifying the initial UE-specific narrowband frequency resource and/or time resource locations, thereby saving signaling overhead.

Embodiment 4

This embodiment provides a resource determining method. The method may be used to determine a resource available to an MTC terminal. In this method, a base station or UE determines initial narrowband frequency resource and/or time resource locations according to at least one of the following: a C-RNTI of the UE, UE-specific parameters (for example, at least one of: a subframe index of a preamble sent by the UE, a frame index, a physical random access resource index, and a frequency start point of the physical random access resource), and common information of a cell (for example, at least one of: system frame number, subframe number, timeslot number, and cell ID).

For example, the base station and the UE may determine the initial UE-specific narrowband frequency resource according to the C-RNTI:

the initial UE-specific narrowband frequency resource index of UEx=(a decimal value corresponding to the C-RNTI of UEx)mod N, where mod is a modulo operation and N is the total number of narrowband frequency resources.

It should be noted that the initial UE-specific narrowband frequency resource and/or time resource locations may be determined according to different combinations of the above parameters. For example, the initial UE-specific narrowband frequency resource alone is determined according to one parameter or a combination of multiple parameters; or the initial UE-specific time resource alone is determined according to one parameter or a combination of multiple parameters; or the initial UE-specific narrowband frequency resource and time resource are determined according to one parameter or a combination of multiple parameters. The determining method is similar to the foregoing method, and is not described exhaustively here any further.

In this embodiment, no new signaling needs to be defined for notifying the initial UE-specific narrowband frequency resource and/or time resource locations, thereby saving signaling overhead.

Embodiment 5

This embodiment provides a resource determining method. The method may be used to determine a resource available to an MTC terminal. In this method, a base station uses display signaling to indicate the UE-specific narrowband frequency resource and/or time resource locations available to the UE (such as an MTC terminal). For example, the base station sends one of the following messages to the UE: random access response message, contention resolution message, and handover command message, where the sent message carries information indicative of the UE-specific narrowband frequency resource and/or time resource locations available to the UE.

Preferably, the base station may add an indication field/information into the random access response message, the contention resolution message, or the handover command message to notify the UE-specific narrowband frequency resource and/or time resource locations. The UE-specific narrowband frequency resource and/or time resource locations are correlated with the temporary C-RNTI in the random access response message or the C-RNTI of the UE. The newly added indication field/information indicates the narrowband frequency resource and/or time resource locations of the UE that uses the temporary C-RNTI or the C-RNTI.

Preferably, the indication field/information newly added in the random access response message or the contention resolution message may indicate the UE-specific narrowband frequency resource location alone, or indicate the UE-specific time resource location alone, or indicate the UE-specific narrowband frequency resource and time resource locations.

Optionally, the indication field/information newly added in the random access response message, the contention resolution message, or the handover command message may indicate the UE-specific narrowband frequency resource location in a localized (localized) resource allocation manner, or indicate the UE-specific narrowband frequency resource location in a distributed (distributed) resource allocation manner. The indication field/information newly added in the random access response message or the contention resolution message may also indicate at least one of the following: subframe resource location, frame resource location, and timeslot time resource location.

For example, as regards a 20-MHz carrier, one carrier includes 100 PRBs. If the size of a narrowband frequency resource is 6 PRBs and the narrowband frequency resource is split continuously (that is, physical resource blocks in each narrowband frequency resource are continuous), one carrier includes 17 narrowband frequency resources, and the size of one of the narrowband frequency resources is 4 PRBs. The narrowband frequency resource may also be numbered cyclically so that any one of the narrowband frequency resources includes 6 PRBs. Because one carrier includes 17 narrowband frequency resources, 5 bits in the random access response message or the contention resolution message may be used to indicate the narrowband resource location to the UE.

If the subframe time resource also needs to be indicated, because one radio frame includes 10 subframes, another 4 bits in the random access response message or the contention resolution message may be used to indicate the subframe resource to the UE. Preferably, joint coding may be used to indicate the narrowband frequency resource location and the subframe resource location, so as to reduce bit overhead.

Preferably, the narrowband frequency resource location may also be specified for the UE in a type-0, type-1 or type-2 resource allocation manner similar to LTE downlink resource allocation. Specifically, the type-0 resource allocation manner is: The system divides the physical resource blocks in the carrier into multiple RBGs by using a physical resource block group (RBG: resource block group) as a unit, and allocates resources in a bitmap manner by using a bit string, where each bit indicates whether a physical resource block group (RBG: resource block group) is allocated to the UE. The type-1 resource allocation manner is: The system divides the physical resource blocks in the carrier into multiple RBGs by using a physical resource block group (RBG: resource block group) as a unit; and the system predetermines the number (N) of RBG subsets, and puts the RBGs into each RBG subset sequentially according to the order of the RBG in the frequency domain. In allocating a resource to the UE, first, a field is used to indicate the RBG subset where the resource to be allocated to the UE is located, and then a bit string is used to indicate the specific allocated RB for the UE in the determined RBG subset in a bitmap manner. The type-2 resource allocation manner is: The system uses a virtual resource block as a unit, and performs allocation of continuous virtual resource blocks by telling the resource allocation start point and length to the UE. Then the system determines the physical resource block resources for data transmission according to the interleaving and permutation mapping rules between the virtual resource block and the physical resource block. Therefore, the type-2 can support discrete resource allocation.

Because type-0, type-1 or type-2 resource allocation can indicate discrete resource allocation, the type-0, type-1 or type-2 resource allocation manner may be used to indicate narrowband frequency resources. In this case, when the type-0, type-1 or type-2 manner is applied, the size of the resource allocated to the UE is the size of the narrowband frequency resource. Once the UE obtains the resource allocated in the type-0, type-1 or type-2, the UE obtains the narrowband frequency resource. Because the resource allocation at this time needs to support allocation of only one resource size, fewer bits can be used to indicate the narrowband frequency resources.

In the foregoing manner, the base station transmits control information (such as an ePDCCH) and/or data (such as contention resolution message or PDSCH transmission) for the UE on the determined initial narrowband frequency resource and/or time resource, and the UE receives the control information and/or data on the determined initial narrowband frequency resource and/or time resource.

Preferably, before the base station sends the random access response message, the contention resolution message, or the handover command message to the UE, the base station may determine the narrowband resource of the UE by using a method described in any one of the foregoing embodiments.

Preferably, when the base station serves as a source base station, before the source base station sends the handover command message to the UE, a target base station may transmit narrowband resource location information to or exchange the narrowband resource location information with the source base station by using an inter-base station interface (such as an ×2 interface).

In this embodiment, a new indication field/information is introduced into the random access response message, the contention resolution message, or the handover command message, thereby indicating the narrowband frequency resource and/or time resource flexibly.

Figure 4:
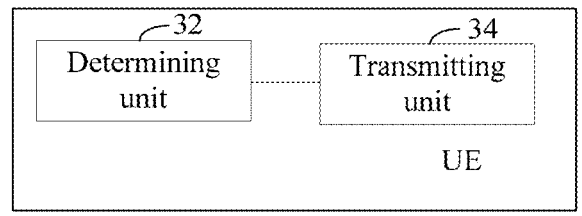
FIG. 4 is a structural block diagram of a user equipment according to an embodiment of the present invention.

Further, a UE is provided in an embodiment of the present invention and the UE may be configured to implement the foregoing method. The UE may be an MTC terminal. FIG. 4 is a structural block diagram of a user equipment according to an embodiment of the present invention. As shown in FIG. 4, the UE includes: a determining unit 32, configured to determine a first narrowband resource available to a machine type communication MTC terminal according to user equipment UE information in a random access process and/or common information of a cell; and a transmitting unit 34, coupled to the determining unit 32, and configured to transmit control information and/or data on the first narrowband resource.

Preferably, the determining unit 32 is configured to determine the first narrowband resource according to correspondence between the first narrowband resource and the UE information in the random access process and/or the common information of a cell; or the determining unit 32 is configured to determine the first narrowband resource according to an indication field in the UE information in the random access process.

Optionally, the first narrowband resource includes a narrowband frequency resource and/or a first time resource. Preferably, the determining unit 32 is configured to: in the following manner, determine the first narrowband resource according to correspondence between the first narrowband resource and the UE information in the random access process and/or the common information of a cell:

determining K narrowband frequency resources corresponding to K transmission time points according to the following formula:

$$S_k=[S_1+(k-1)\times\Delta]\bmod N,$$

where $S_1=f(x, y)\bmod N$ or $S_1=\text{floor}[f(x, y)/N]$, where $S_k$ represents an index of a $k^{th}$ narrowband frequency resource, $S_1$ represents an index of a first narrowband frequency resource, f(x, y) represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, . . . , K, where K is an integer not less than 1.

Preferably, the determining unit 32 is configured to: in the following manner, determine the first narrowband resource according to correspondence between the first narrowband resource and the UE information in the random access process and/or the common information of a cell:

determining the first time resource according to one of the following formulas:

$$t_1=f(x,y)\bmod N1,$$

$$t_1=\text{floor}[f(x,y)/N1],$$

$$t_1 \bmod T=f(x,y)\bmod N1, \text{ and}$$

$$t_1 \bmod T=\text{floor}[f(x,y)/N1],$$

where $t_1$ represents an index of the first time resource, f(x, y) represents a function inclusive of x and/or y, x represents the UE information, y represents the common information of a cell, N1 represents a total number of first time resources, mod represents a modulo operation, floor represents a round-down operation, and T represents a configuration cycle of the first time resource.

Figure 5:
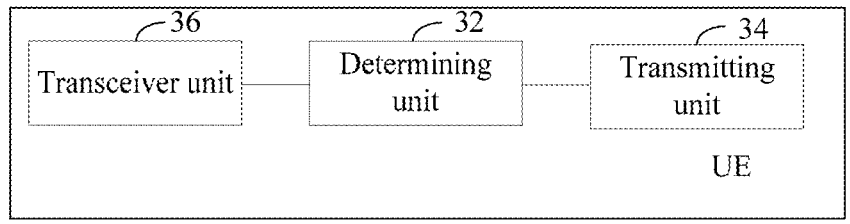
FIG. 5 is a detailed structural block diagram of a user equipment according to an embodiment of the present invention.

FIG. 5 is an exemplary structural block diagram of a user equipment according to an embodiment of the present invention. As shown in FIG. 5, the UE further includes: a transceiver unit 36, configured to receive or send a first message in the random access process, where the first message carries the UE information inclusive of the indication field, where the determining unit 32 is further configured to determine the first narrowband resource according to the indication field.

Optionally, the first message includes one of the following: a random access response message, a contention resolution message, and an answer message in response to the random access response message.

Preferably, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

Optionally, the transmitting unit 34 is configured to transmit control information and/or data on the first narrowband resource in at least one of the following manners: receiving the contention resolution message on the first narrowband resource; or, transmitting dedicated information on the first narrowband resource.

Preferably, the transmitting unit 34 transmits the dedicated information on the first narrowband resource in the following manner: using the first narrowband resource when transmitting the dedicated information for the first time after the random access process.

Figure 6:
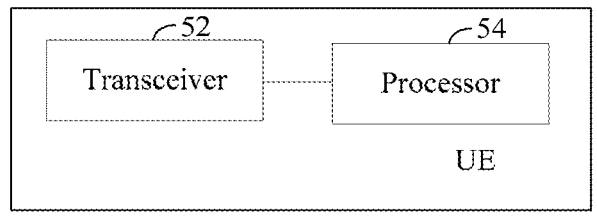
FIG. 6 is a structural block diagram of another user equipment according to an embodiment of the present invention.

Further, a UE is provided in an embodiment of the present invention and the UE may be configured to implement the foregoing method. The UE may be an MTC terminal. FIG. 6 is a structural block diagram of another user equipment according to an embodiment of the present invention. As shown in FIG. 6, the UE includes: a transceiver 52, configured to receive and send a signal; and a processor 54, coupled to the transceiver 52, and configured to perform the following steps: determining a first narrowband resource available to a machine type communication MTC terminal according to user equipment UE information in a random access process and/or common information of a cell; and controlling the transceiver 52 to transmit control information and/or data on the first narrowband resource.

Preferably, the processor 54 is configured to: in the following manner, determine a first narrowband resource available to a machine type communication MTC terminal according to user equipment UE information in a random access process and/or common information of a cell: determining the first narrowband resource according to correspondence between the first narrowband resource and the UE information in the random access process and/or the common information of a cell; or determining the first narrowband resource according to an indication field in the UE information in the random access process.

Preferably, the first narrowband resource includes a narrowband frequency resource and/or a first time resource.

Optionally, in the following manner, the processor 54 determines the first narrowband resource according to correspondence between the first narrowband resource and the UE information in the random access process and/or the common information of a cell:

determining K narrowband frequency resources corresponding to K transmission time points according to the following formula:

$$S_k=[S_1+(k-1)\times\Delta]\bmod N,$$

where $S_1=f(x, y)\bmod N$ or $S_1=\text{floor}[f(x, y)/N]$,
where $S_k$ represents an index of a $k^{th}$ narrowband frequency resource, $S_1$ represents an index of a first narrowband frequency resource, f(x, y) represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, ... , K, where K is an integer not less than 1.

Preferably, in the following manner, the processor 54 determines the first narrowband resource according to correspondence between the first narrowband resource and the UE information in the random access process and/or the common information of a cell:

determining the first time resource according to one of the following formulas:

$$t_1=f(x,y)\bmod N1,$$

$$t_1=\text{floor}[f(x,y)/N1],$$

$$t_1 \bmod T=f(x,y)\bmod N1,\text{ and}$$

$$t_1 \bmod T=\text{floor}[f(x,y)/N1],$$

where $t_1$ represents an index of the first time resource, f(x, y) represents a function inclusive of x and/or y, x represents the UE information, y represents the common information of a cell, N1 represents a total number of first time resources, mod represents a modulo operation, floor represents a round-down operation, and T represents a configuration cycle of the first time resource.

Optionally, the processor 54 is configured to determine the first narrowband resource in the following manner according to an indication field in the UE information in the random access process: controlling the transceiver 52 to receive or send a first message in the random access process, where the first message carries the UE information inclusive of the indication field; and determining the first narrowband resource according to the indication field.

Preferably, the first message includes one of the following: a random access response message, a contention resolution message, and an answer message in response to the random access response message.

Preferably, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

Optionally, the processor 54 controls the transceiver 52 in at least one of the following manners to transmit control information and/or data on the first narrowband resource: the processor 54 controls the transceiver 52 to receive the contention resolution message on the first narrowband resource; and the processor 54 controls the transceiver 52 to transmit dedicated information on the first narrowband resource.

Preferably, the processor 54 controls the transceiver 52 in the following manner to transmit dedicated information on the first narrowband resource: the processor 54 controls the transceiver 52 to use the first narrowband resource when transmitting the dedicated information for the first time after the random access process.

Figure 7:
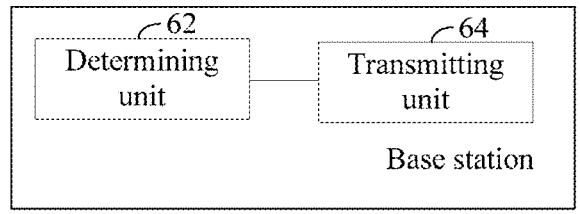
FIG. 7 is a structural block diagram of a base station according to an embodiment of the present invention.

Further, a base station is provided in an embodiment of the present invention. The base station can implement the foregoing method embodiment, and the base station may be the network-side device in the foregoing method embodiment. FIG. 7 is a structural block diagram of a base station according to an embodiment of the present invention. As shown in FIG. 7, the base station includes: a determining unit 62, configured to determine a first narrowband resource available to a machine type communication MTC terminal according to user equipment UE information in a random access process and/or common information of a cell; and a transmitting unit 64, coupled to the determining unit 62, and configured to transmit control information and/or data on the first narrowband resource.

Preferably, the determining unit 62 is configured to determine the first narrowband resource according to correspondence between the first narrowband resource and the UE information in the random access process and/or the common information of a cell; or the determining unit 62 is configured to determine the first narrowband resource according to an indication field in the UE information in the random access process.

Optionally, the first narrowband resource includes a narrowband frequency resource and/or a first time resource.

Preferably, the determining unit 62 is configured to: in the following manner, determine the first narrowband resource according to correspondence between the first narrowband resource and the UE information in the random access process and/or the common information of a cell:

determining K narrowband frequency resources corresponding to K transmission time points according to the following formula:

$$S_k=[S_1+(k-1)\times\Delta]\bmod N,$$

where $S_1=f(x,y)\bmod N$ or $S_1=\text{floor}[f(x,y)/N]$, where $S_k$ represents an index of a $k^{th}$ narrowband frequency resource, $S_1$ represents an index of a first narrowband frequency resource, f(x, y) represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, K, where K is an integer not less than 1.

Preferably, the determining unit 62 is configured to: in the following manner, determine the first narrowband resource according to correspondence between the first narrowband resource and the UE information in the random access process and/or the common information of a cell: determining the first time resource according to one of the following formulas:

$$t_1=f(x,y)\bmod N1,$$

$$t_1=\text{floor}[f(x,y)/N1],$$

$$t_1 \bmod T=f(x,y)\bmod N1, \text{ and}$$

$$t_1 \bmod T=\text{floor}[f(x,y)/N1],$$

where $t_1$ represents an index of the first time resource, f(x, y) represents a function inclusive of x and/or y, x represents the UE information, y represents the common information of a cell, N1 represents a total number of first time resources, mod represents a modulo operation, floor represents a round-down operation, and T represents a configuration cycle of the first time resource.

Figure 8:
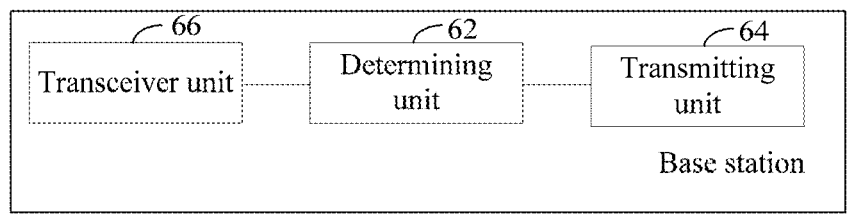
FIG. 8 is a detailed structural block diagram of a base station according to an embodiment of the present invention.
Figure 9:
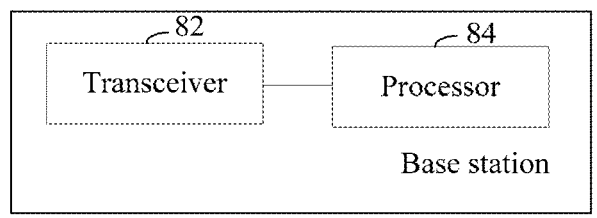
FIG. 9 is a structural block diagram of another base station according to an embodiment of the present invention.

FIG. 8 is a specific structural block diagram of a base station according to an embodiment of the present invention. As shown in FIG. 8, preferably, the base station further includes: a transceiver unit 66, configured to receive or send a first message in the random access process, where the first message carries the UE information inclusive of the indication field; and the determining unit 62 is further configured to determine the first narrowband resource according to the indication field.

Preferably, the first message includes one of the following: a random access response message, a contention resolution message, and an answer message in response to the random access response message.

Optionally, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

Preferably, the transmitting unit 64 is configured to transmit control information and/or data on the first narrowband resource in at least one of the following manners: The transmitting unit 64 is configured to send the contention resolution message on the first narrowband resource; or, the transmitting unit 64 is configured to transmit dedicated information on the first narrowband resource.

Optionally, the transmitting, by the transmitting unit 64, the dedicated information on the first narrowband resource, includes: using, by the transmitting unit 64, the first narrowband resource when transmitting the dedicated information for the first time after the random access process.

Further, a base station is provided in an embodiment of the present invention. The base station can implement the foregoing method embodiment, and the base station may be the network-side device in the foregoing method embodiment. FIG. 8 is a structural block diagram of a base station according to an embodiment of the present invention. As shown in FIG. 8, the base station includes: a transceiver 82, configured to receive and send a signal; and a processor 84, coupled to the transceiver 82, and configured to perform the following steps: determining a first narrowband resource available to a machine type communication MTC terminal according to user equipment UE information in a random access process and/or common information of a cell; and controlling the transceiver to transmit control information and/or data on the first narrowband resource.

Preferably, the processor 84 is configured to: in the following manner, determine a first narrowband resource available to a machine type communication MTC terminal according to UE information in a random access process and/or common information of a cell: determining the first narrowband resource according to correspondence between the first narrowband resource and the UE information in the random access process and/or the common information of a cell; or determining the first narrowband resource according to an indication field in the UE information in the random access process.

Optionally, the first narrowband resource includes a narrowband frequency resource and/or a first time resource.

Optionally, in the following manner, the processor 84 determines the first narrowband resource according to correspondence between the first narrowband resource and the UE information in the random access process and/or the common information of a cell:

determining K narrowband frequency resources corresponding to K transmission time points according to the following formula:

$$S_k=[S_1+(k-1)\times\Delta]\bmod N,$$

where $S_1=f(x,y)\bmod N$ or $S_1=\text{floor}[f(x,y)/N]$, where $S_k$ represents an index of a $k^{th}$ narrowband frequency resource, $S_1$ represents an index of a first narrowband frequency resource, f(x, y) represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, . . . , K, where K is an integer not less than 1.

Preferably, in the following manner, the processor 84 determines the first narrowband resource according to correspondence between the first narrowband resource and the UE information in the random access process and/or the common information of a cell:

determining the first time resource according to one of the following formulas:

$t_1 = f(x,y) \bmod N1,$ $t_1 = \text{floor}[f(x,y)/N1],$ $t_1 \bmod T = f(x,y) \bmod N1,$ and $t_1 \bmod T = \text{floor}[f(x,y)/N1],$ where $t_1$ represents an index of the first time resource, f(x, y) represents a function inclusive of x and/or y, x represents the UE information, y represents the common information of a cell, N1 represents a total number of first time resources, mod represents a modulo operation, floor represents a round-down operation, and T represents a configuration cycle of the first time resource.

Optionally, the processor 84 is configured to determine the first narrowband resource in the following manner according to an indication field in the UE information in the random access process: controlling the transceiver 82 to receive or send a first message in the random access process, where the first message carries the UE information inclusive of the indication field; and determining the first narrowband resource according to the indication field.

Preferably, the first message includes one of the following: a random access response message, a contention resolution message, and an answer message in response to the random access response message.

Preferably, the common information of a cell includes at least one of the following: a system frame number, a subframe number, a timeslot number, a cell identifier ID, one or more parameters in a physical random access channel configuration, and one or more parameters in a common configuration of a random access channel; the UE information includes at least one of the following: an index of a preamble sequence, a temporary radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

Preferably, the processor 84 controls the transceiver 82 in at least one of the following manners to transmit control information and/or data on the first narrowband resource:

the processor 84 controls the transceiver 82 to send the contention resolution message on the first narrowband resource; and the processor 84 controls the transceiver 82 to transmit dedicated information on the first narrowband resource.

Preferably, the controlling, by the processor 84, the transceiver 82 to transmit dedicated information on the first narrowband resource, includes: controlling, by the processor 84, the transceiver 82 to use the first narrowband resource when transmitting the dedicated information for the first time after the random access process.

The processor in the embodiments of the present invention may be an integrated circuit chip capable of processing signals, or a hardware processor such as a central processing unit (CPU). In the implementation process, the steps of the method may be implemented by integrated logic circuits of hardware in the processor or by software instructions. Such instructions may be used by the processor to exercise control and implement the method disclosed in the embodiments of the present invention. The processor may be a universal processor, a digital signal processor (DSP), an application-specific integrated circuit (ASIC), a field programmable gate array (FPGA) or another programmable logical device, a stand-alone gate or a transistor logical device, or a stand-alone hardware component. It can implement or execute the methods, steps and logical block diagrams disclosed in the embodiments of the present invention. The universal processor may be a microprocessor or any conventional processor, decoder, and so on. The steps of the method disclosed in the embodiments of the present invention may be executed by a hardware processor directly, or by a combination of hardware and software modules in the processor. The software modules may reside in a random access memory, a flash memory, a read-only memory, a programmable read-only memory, an electrically erasable programmable ROM, a register, or any other storage media that are mature in the art.

According to the descriptions in the foregoing embodiments, a person skilled in the art can clearly understand that the present invention may be implemented by hardware or firmware or a combination thereof. When the present invention is implemented by software, the functions may be stored in a computer-readable medium or transmitted as one or more instructions or codes on the computer-readable medium. The computer-readable medium comes in many types including a computer storage medium and a communication medium, where the communication medium may be any medium capable of transferring computer programs from one place to another conveniently. The storage medium may be any available medium that is accessible by a computer. Examples of the computer-readable medium include but are not limited to: a random access memory (RAM), a read-only memory (ROM), an electrically erasable programmable read-only memory (EEPROM), a compact disc read-only memory (CD-ROM), or other compact disc storages or disk storage mediums or other magnetic storage devices, or any other computer-accessible medium that is available for carrying or storing expected program code in an instruction form or a data structure form. In addition, any connection may become a computer-readable medium to an appropriate extent. For example, if software is transmitted from a website, a server or another remote source by using a coaxial cable, an optical cable, a twisted pair, or a digital subscriber line (DSL), or by using a radio technology such as infrared transmission, radio transmission and microwave transmission, then the coaxial cable, or optical cable, or twisted pair, or DSL, or the radio technology such as infrared transmission, radio transmission and microwave transmission, is included in the definition of the medium. In the description of the present invention, disks (Disk) and discs (disc) include a compact disc (CD), a laser disc, an optical disc, a digital versatile disk (DVD), a floppy disk, and a Blu-ray disc. Generally, the disk reproduces data magnetically, and the disc reproduces data optically by using laser. Combinations of them shall also be covered in the protection scope of the computer-readable medium.

In conclusion, the preceding descriptions are merely exemplary embodiments of the present invention, but are not intended to limit the protection scope of the present invention. Any modification, equivalent replacement, or improvement made within the spirit and principle of the present invention shall fall within the protection scope of the present invention.

Some methods or apparatus are further given herein.

A resource determining method is provided, comprising:

determining a first narrowband resource available to a machine type communication (MTC) terminal according to user equipment (UE) information in a random access process and/or common information of a cell; and transmitting control information and/or data on the first narrowband resource.

Optionally, the determining a first narrowband resource available to an MTC terminal according to UE information in a random access process and/or common information of a cell comprises:

determining the first narrowband resource according to correspondence between the first narrowband resource and the UE information in the random access process and/or the common information of a cell; or determining the first narrowband resource according to an indication field in the UE information in the random access process.

Optionally, the first narrowband resource comprises a narrowband frequency resource and/or a first time resource.

Optionally, the determining the first narrowband resource according to correspondence between the first narrowband resource and the UE information in the random access process and/or the common information of a cell comprises:

determining K narrowband frequency resources corresponding to K transmission time points according to the following formula or a form having a correspondence under the following formula:

$$S_k = [S_1 + (k-1) \times \Delta] \bmod N,$$

wherein $S_1 = f(x,y) \bmod N$ or $S_1 = \mathrm{floor}[f(x,y)/N]$, wherein $S_k$ represents an index of a $k^{th}$ narrowband frequency resource, $S_1$ represents an index of a first narrowband frequency resource, $f(x, y)$ represents a function inclusive of x and/or y, x represents the UE information, y represents the common information of a cell, N represents a total number of narrowband frequency resources, mod represents a modulo operation, floor represents a round-down operation, $\Delta$ is a predetermined value, and $k=1, \ldots, K$, wherein K is an integer not less than 1.

Optionally, the determining the first narrowband resource according to correspondence between the first narrowband resource and the UE information in the random access process and/or the common information of a cell comprises:

determining the first time resource according to one of the following formulas or a form having a correspondence under one of the following formulas:

$$t_1 = f(x,y) \bmod N1,$$

$$t_1 = \mathrm{floor}[f(x,y)/N1],$$

$$t_1 \bmod T = f(x,y) \bmod N1, \text{ and}$$

$$t_1 \bmod T = \mathrm{floor}[f(x,y)/N1],$$

wherein $t_1$ represents an index of the first time resource, $f(x, y)$ represents a function inclusive of x and/or y, x represents the UE information, y represents the common information of a cell, N1 represents a total number of first time resources, mod represents a modulo operation, floor represents a round-down operation, and T represents a configuration cycle of the first time resource.

Optionally, the determining the first narrowband resource according to an indication field in the UE information in the random access process comprises:

receiving a first message in the random access process, wherein the first message carries the UE information inclusive of the indication field;

determining the first narrowband resource according to the indication field; and wherein the first message comprises one of the following: a random access response message, a contention resolution message, and an answer message in response to the random access response message.

Optionally, the common information of a cell comprises at least one of the following: a system frame number, a subframe number, a timeslot number, a cell identifier (ID), one or more parameters in a physical random access channel configuration, and one or more parameters in a common configuration of a random access channel; or the UE information comprises at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

Optionally, the transmitting control information and/or data on the first narrowband resource comprises at least one of the following:

receiving, by the UE, the contention resolution message on the first narrowband resource;

sending, by a base station, the contention resolution message on the first narrowband resource; and transmitting, by the UE or the base station, dedicated information on the first narrowband resource.

A user equipment is provided, comprising:

a transceiver, configured to receive and send a signal; and a processor, configured to:

determine a first narrowband resource available to a machine type communication (MTC) terminal according to user equipment (UE) information in a random access process and/or common information of a cell, and control the transceiver to transmit control information and/or data on the first narrowband resource.

Optionally, the processor is configured to determine a first narrowband resource available to a machine type communication MTC terminal according to user equipment UE information in a random access process and/or common information of a cell, in the following manner:

determine the first narrowband resource according to correspondence between the first narrowband resource and the UE information in the random access process and/or the common information of a cell; or determine the first narrowband resource according to an indication field in the UE information in the random access process.

Optionally, the first narrowband resource comprises a narrowband frequency resource and/or a first time resource.

Optionally, the processor is configured to determine the first narrowband resource according to correspondence between the first narrowband resource and the UE information in the random access process and/or the common information of a cell, in the following manner:

determine K narrowband frequency resources corresponding to K transmission time points according to the following formula or a form having a correspondence under the following formula:

$S_k=[S_1+(k-1)\times\Delta]\bmod N$, wherein $S_1=f(x,y)\bmod N$ or $S_1=\text{floor}[f(x,y)/N]$, wherein $S_k$ represents an index of a $k^{th}$ narrowband frequency resource, $S_1$ represents an index of a first narrowband frequency resource, f(x, y) represents a function inclusive of x and/or y, x represents the UE information, y represents the common information of a cell, N represents a total number of narrowband frequency resources, mod represents a modulo operation, floor represents a round-down operation, $\Delta$ is a predetermined value, and k=1, . . . , K, wherein K is an integer not less than 1.

Optionally, the processor is configured to determine the first narrowband resource according to correspondence between the first narrowband resource and the UE information in the random access process and/or the common information of a cell, in the following manner:

determine the first time resource according to one of the following formulas or a form having a correspondence under one of the following formulas:

$t_1=f(x,y)\bmod N1$, $t_1=\text{floor}[f(x,y)/N1]$, $t_1 \bmod T=f(x,y)\bmod N1$, and $t_1 \bmod T=\text{floor}[f(x,y)/N1]$, wherein $t_1$ represents an index of the first time resource, f(x, y) represents a function inclusive of x and/or y, x represents the UE information, y represents the common information of a cell, N1 represents a total number of first time resources, mod represents a modulo operation, floor represents a round-down operation, and T represents a configuration cycle of the first time resource.

Optionally, the processor is configured to determine the first narrowband resource according to an indication field in the UE information in the random access process, in the following manner:

control the transceiver to receive or send a first message in the random access process, wherein the first message carries the UE information inclusive of the indication field; and determine the first narrowband resource according to the indication field, wherein the first message comprises one of the following: a random access response message, a contention resolution message, and an answer message in response to the random access response message.

Optionally, the common information of a cell comprises at least one of the following: a system frame number, a subframe number, a timeslot number, a cell identifier (ID), one or more parameters in a physical random access channel configuration, and one or more parameters in a common configuration of a random access channel; or the UE information comprises at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

A base station is provided, comprising:
a transceiver configured to receive and send a signal; and
a processor configured to:
determine a first narrowband resource available to a machine type communication (MTC) terminal according to user equipment (UE) information in a random access process and/or common information of a cell, and
control the transceiver to transmit control information and/or data on the first narrowband resource.

Optionally, the processor is configured to determine a first narrowband resource available to a machine type communication MTC terminal according to UE information in a random access process and/or common information of a cell, in the following manner:

determine the first narrowband resource according to correspondence between the first narrowband resource and the UE information in the random access process and/or the common information of a cell; or determine the first narrowband resource according to an indication field in the UE information in the random access process.

Optionally, the first narrowband resource comprises a narrowband frequency resource and/or a first time resource.

Optionally, the processor is configured to determine the first narrowband resource according to an indication field in the UE information in the random access process, in the following manner:

control the transceiver to receive or send a first message in the random access process, wherein the first message carries the UE information inclusive of the indication field; and determine the first narrowband resource according to the indication field, wherein the first message comprises one of the following: a random access response message, a contention resolution message, and an answer message in response to the random access response message. resource.

Optionally, the common information of a cell comprises at least one of the following: a system frame number, a subframe number, a timeslot number, a cell identifier (ID), one or more parameters in a physical random access channel configuration, and one or more parameters in a common configuration of a random access channel; or the UE information comprises at least one of the following: an index of a preamble sequence, a temporary cell radio network temporary identifier (temporary C-RNTI) allocated to a UE, a minimum or maximum uplink physical resource block PRB index value allocated to the UE and available for sending the answer message in response to the random access response message, a radio network temporary identifier C-RNTI allocated to the UE, a subframe index of a preamble sequence sent by the UE, a frame index of the preamble sequence sent by the UE, a physical random access resource index, and a frequency start point of the physical random access resource.

What is claimed is:
1. An apparatus, comprising:
a processor, coupled with a storage medium configured to store instructions,
wherein the processor is configured to execute the instructions, and when the instructions are executed by the processor, the instructions cause the apparatus to:

determine a narrowband resource available to a machine type communication (MTC) terminal according to a correspondence between the narrowband resource and an index of a preamble sequence used by the apparatus in a random access process, wherein the apparatus is the MTC terminal or a chip for the MTC terminal and the narrowband resource comprises a narrowband frequency resource, and receive downlink control information for the MTC terminal carried on the determined narrowband resource.

2. The apparatus according to claim 1, wherein the correspondence comprises a correspondence between the narrowband resource and a result of a modulo operation on the index of the preamble sequence in the random access process.

3. The apparatus according to claim 2, wherein the correspondence satisfies a formula, and the formula is:

an initial terminal-specific narrowband frequency resource index of the MTC terminal=(the index of the preamble sequence used by the MTC terminal) mod N, wherein N is a total number of narrowband frequency resources in a carrier or a total number of narrowband frequency resources in multiple carriers.

4. The apparatus according to claim 1, wherein to determine the narrowband resource, when executed by the processor, the instructions cause the apparatus to:

determine K narrowband frequency resources corresponding to K transmission time points according to the following formula or a form having a correspondence under the following formula:

$S_k[S_1+(k-1)\times\Delta]\mod N,$ wherein $S_1=f(x,y)\mod N$ or $S_1=\text{floor}[f(x,y)/N]$, wherein $S_k$ represents an index of a $k^{th}$ narrowband frequency resource, $S_1$ represents an index of the narrowband frequency resource, f(x, y) represents a function inclusive of x and/or y, x represents the MTC terminal information, y represents common information of a cell, N represents a total number of narrowband frequency resources, mod represents a modulo operation, floor represents a round-down operation, Δ is a predetermined value, and k=1, . . . , K, wherein K is an integer not less than 1.

5. The apparatus according to claim 1, wherein:

the correspondence comprises:

a correspondence between the narrowband resource and a result of a modulo operation on a function inclusive of the index of the preamble sequence or a correspondence between the narrowband resource and a result of a modulo operation on a function inclusive of the index of the preamble sequence and common information of a cell.

6. The apparatus according to claim 1, wherein the downlink control information comprises control information for a contention resolution message.

7. An apparatus, comprising:

a first circuit, configured to: determine a narrowband resource available to a machine type communication (MTC) terminal according to a correspondence between the narrowband resource and an index of a preamble sequence used by the apparatus in a random access process, wherein the apparatus is the MTC terminal or a chip for the MTC terminal and the narrowband resource comprises a narrowband frequency resource; and a second circuit, configured to receive downlink control information for the MTC terminal carried on the narrowband resource.

8. The apparatus according to claim 7, wherein the correspondence comprises a correspondence between the narrow band resource and a result of a modulo operation on the index of the preamble sequence in the random access process.

9. The apparatus according to claim 8, wherein the correspondence satisfies a formula, and the formula is:

an initial terminal-specific narrowband frequency resource index of the MTC terminal=(the index of the preamble sequence used by the MTC terminal) mod N, wherein N is a total number of narrowband frequency resources in a carrier or a total number of narrowband frequency resources in multiple carriers.

10. The apparatus according to claim 7, wherein to determine the narrowband resource, the first circuit is configured to:

determine K narrowband frequency resources corresponding to K transmission time points according to the following formula or a form having a correspondence under the following formula:

$S_k=[S_1+(k-1)\times\Delta]\mod N,$ wherein $S_1=f(x,y)\mod N$ or $S_1=\text{floor}[f(x,y)/N]$, wherein $S_k$ represents an index of a $k^{th}$ narrowband frequency resource, $S_1$ represents an index of the narrowband frequency resource, f(x, y) represents a function inclusive of x and/or y, x represents the MTC terminal information, y represents common information of a cell, N represents a total number of narrowband frequency resources, mod represents a modulo operation, floor represents a round-down operation, Δ is a predetermined value, and k=1, . . . , K, wherein K is an integer not less than 1.

11. The apparatus according to claim 7, wherein:

the correspondence comprises:

a correspondence between the narrowband resource and a result of a modulo operation on a function inclusive of the index of the preamble sequence or a correspondence between the narrowband resource and a result of a modulo operation on a function inclusive of the index of the preamble sequence and common information of a cell.

12. The apparatus according to claim 7, wherein the downlink control information comprises control information for a contention resolution message.

13. A non-transitory storage medium, storing program instructions, wherein when the program instructions are executed by a processor, cause the processor to perform a method that comprises:

determining a narrowband resource available to a machine type communication (MTC) terminal according to a correspondence between the narrowband resource and an index of a preamble sequence used by the MTC terminal in a random access process, wherein the narrowband resource comprises a narrowband frequency resource; and receiving downlink control information for the MTC terminal carried on the narrowband resource.

14. The storage medium according to claim 13, wherein the correspondence comprises a correspondence between the narrowband resource and a result of a modulo operation on the index of the preamble sequence in the random access process.

15. The storage medium according to claim 14, wherein the correspondence satisfies a formula and
the formula is:
an initial terminal-specific narrowband frequency resource index of the MTC terminal=(the index of the preamble sequence used by the MTC terminal) mod N, wherein N is a total number of narrowband frequency resources in a carrier or a total number of narrowband frequency resources in multiple carriers.

16. The storage medium according to claim 13, wherein to determine the narrowband resource, the program, when executed by the processor, causes the processor to:
determine K narrowband frequency resources corresponding to K transmission time points according to the following formula or a form having a correspondence under the following formula:

$S_k = [S_1 + (k-1) \times \Delta] \mod N$, wherein $S_1 = f(x,y) \mod N$ or $S_1 = \text{floor}[f(x,y)/N]$,
wherein $S_k$ represents an index of a $k^{th}$ narrowband frequency resource, $S_1$ represents an index of the narrowband frequency resource, f(x, y) represents a function inclusive of x and/or y, x represents the MTC terminal information, y represents common information of a cell, N represents a total number of narrowband frequency resources, mod represents a modulo operation, floor represents a round-down operation, $\Delta$ is a predetermined value, and k=1, . . . , K, wherein K is an integer not less than 1.

17. The storage medium according to claim 13, wherein:
the correspondence comprises:
a correspondence between the narrowband resource and a result of a modulo operation on a function inclusive of the index of the preamble sequence or a correspondence between the narrowband resource and a result of the index of the preamble sequence and common information of a cell.

18. The storage medium according to claim 13, wherein the downlink control information comprises control information for a contention resolution message.

* * * * *